United States Patent [19]
Fiegel, Jr. et al.

[11] 3,864,812
[45] Feb. 11, 1975

[54] METHOD FOR ASSEMBLY OF CYLINDRICAL WELDED TANKS IN SITU IN HORIZONTAL POSITION

[75] Inventors: Harry J. Fiegel, Jr., Leaque City; Russell S. Thatcher, Alvin, both of Tex.

[73] Assignee: Kelso Marine, Inc., Galveston, Tex.

[22] Filed: Jan. 30, 1973

[21] Appl. No.: 327,957

[52] U.S. Cl............... 29/471.1, 29/484, 228/6, 219/59
[51] Int. Cl............................................ B23k 31/02
[58] Field of Search........ 29/484, 493, 471.1; 228/4, 228/6, 48; 219/59, 61; 113/120 QA

[56] References Cited
UNITED STATES PATENTS

| | | | |
|---|---|---|---|
| 1,740,033 | 12/1929 | Pinckney | 228/48 X |
| 2,669,015 | 2/1954 | Schanz | 29/493 X |
| 3,480,158 | 11/1969 | Pandjiris et al. | 228/48 X |
| 3,734,387 | 5/1973 | Sannipoli | 29/484 X |

Primary Examiner—Francis S. Husar
Assistant Examiner—Robert J. Craig
Attorney, Agent, or Firm—Jack W. Hayden

[57] ABSTRACT

A method of and apparatus for assembling a cylindrical container, such as large cylindrical vessels, in horizontal end use position such as pressure vessels supported within a marine vessel hull. By positioning stepwise a plurality of rings in horizontal end to end relatqon on roller supports and rotating the rings while welding them, a cylindrical vessel of predetermined length and size may be formed. Control means synchronize the rotation of the cylindrical rings with the welding operation to assure a continuous weld of proper depth to connect the cylindrical sections together.

Saddle or support means are provided for receiving the completed vessel and idler roller means and drive roller means are provided which engage the cylindrical sections during rotation and forming of the vessel which may be removed so that the completed cylindrical container may then rest on the saddle or support means. If desired, suitable insulaitn may be provided between the support means and container.

1 Claim, 12 Drawing Figures

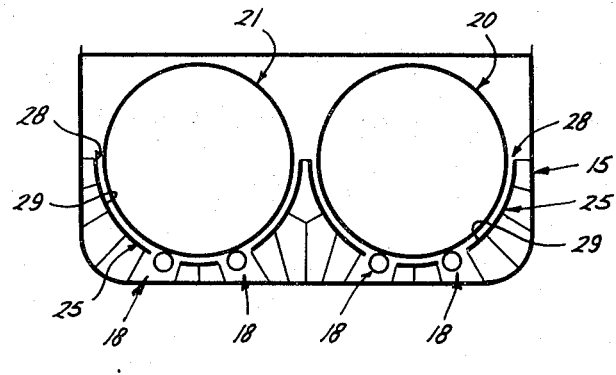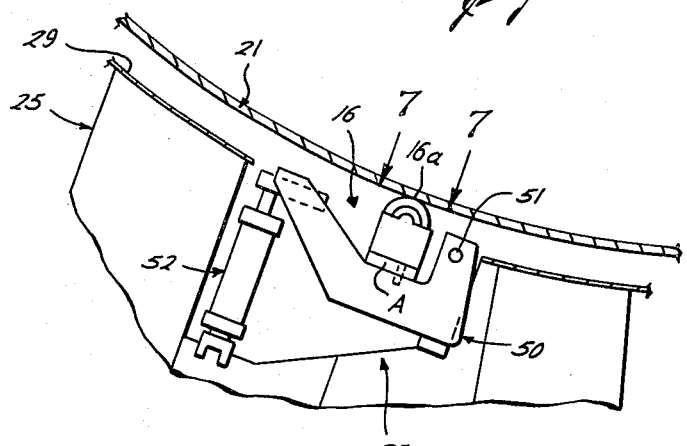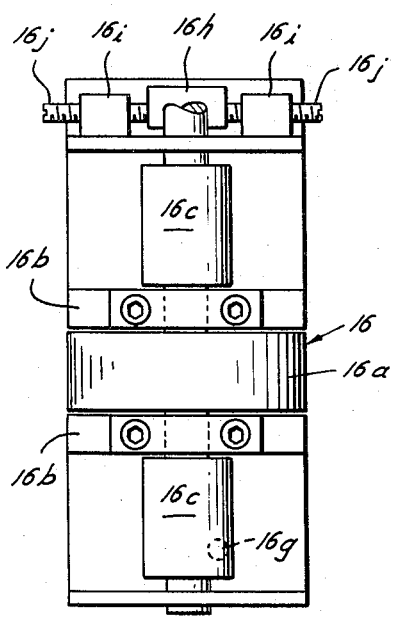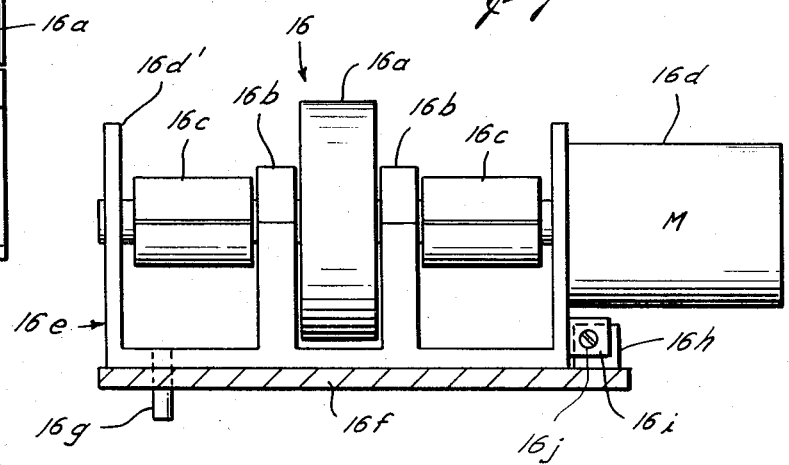

3,864,812

METHOD FOR ASSEMBLY OF CYLINDRICAL WELDED TANKS IN SITU IN HORIZONTAL POSITION

SUMMARY OF THE INVENTION

Where the physical size of a cylindrical vessel becomes too large for fabrication in a shop or yard, or is of such bulk and weight that transporting of the completed unit is impractical, other means and methods for fabricating such large vessels must be provided, or the vessel may be erected in sections rather than as a complete whole with the sections then welded together at the final use location by hand or mechanical welding equipment.

So far as known to applicant, no one has provided a satisfactory method and arrangement for assembling cylindrical containers in a horizontal end use position such as, by way of example, in marine hulls, which marine hulls are used to convey the containers for transporting various materials in the cylindrical containers. It can be appreciated that such cylindrical containers may be of substantial diameter and length such as, by way of example, from 20 to 80 feet in diameter, and 20 to 200 or 300 feet in length.

An object of the present invention is to provide a method of and apparatus for assembling large cylindrical containers in situ in horizontal position in marine hulls.

A further object is to provide a drill roll arrangement including a plurality of longitudinally spaced rollers which maintains uniform frictional engagement with a cylindrical vessel during fabrication.

Another object of the present invention is to provide a drive roll arrangement including a plurality of longitudinally spaced rollers which maintains uniform frictional engagement with a cylindrical vessel during fabrication, and means for controlling the amount of frictional engagement between the drive roll means and cylindrical vessel.

Yet another object is to provide a drive roll arrangement including a plurality of longitudinally spaced rollers which maintains uniform frictional engagement with a cylindrical vessel during fabrication and means for controlling the amount of frictional engagement between the drive roll means and cylindrical vessel and means for automatically rotating said drive roll means in response to the degree of welding completion between sections.

Still another object of the present invention is to provide a control arrangement to stepwise rotate large cylindrical sections so that they may be welded at their circumferential edges while rotating them.

A further object of the present invention is to provide a method of assembling cylindrical containers in situ in their horizontal end use position.

Yet a further object of the present invention is to provide an arrangement for supporting cylindrical sections to enable the cylindrical sections to be rotated so that they can be welded together to form a cylindrical container.

Yet another object of the present invention is to provide an arrangement for supporting cylindrical sections during fabrication of a cylindrical container, and means for lowering the completed container onto a curved saddle or other type of support.

Still a further object of the present invention is to provide an idler roll and drive roll arrangement for supporting cylindrical sections whereby they may be rotated and stepwise positioned in end to end relation for welding so that a cylindrical container may be formed in situ in horizontal final end use position.

Other objects and advantages of the present invention will become apparent from a consideration of the description and drawings.

BRIEF DESCRIPTION OF THE DRAWINGS

FIG. 5 is a diagrammatic sectional view of a marine hull illustrating diagrammatically a typical curved saddle support means formed in the marine hull at spaced intervals and idler rollers engaging the cylindrical sections during fabrication of the cylindrical container;

FIG. 6 is an enlarged partial sectional view illustrating in greater detail a portion of a typical curved saddle support means for the completed vessel and an arrangement for adjustably mounting a drive roller thereon to maintain continued contact of drive roll with surface of vessel as the vessel is rotated during the welding process;

FIG. 7 is a view on the line 7—7 of FIG. 6 showing in greater detail an arrangement of the drive roller means and the support arrangement for the drive roller means, as well as means for adjusting the drive roller means to align the axis thereof with the axis of the cylindrical section it engages, and means to maintain the cylindrical section in such adjusted position;

FIG. 8 is a side view of the drive roller arrangement of FIGS. 6 and 7 showing the support arrangement therefor in greater detail and the means for adjusting such drive roller arrangement to align it;

DESCRIPTION OF THE PREFERRED EMBODIMENT.

The present invention will be described where containers are formed within a marine hull as the marine hull is also fabricated; however, the method and means of the present invention may be employed in other environments.

Figure 1:
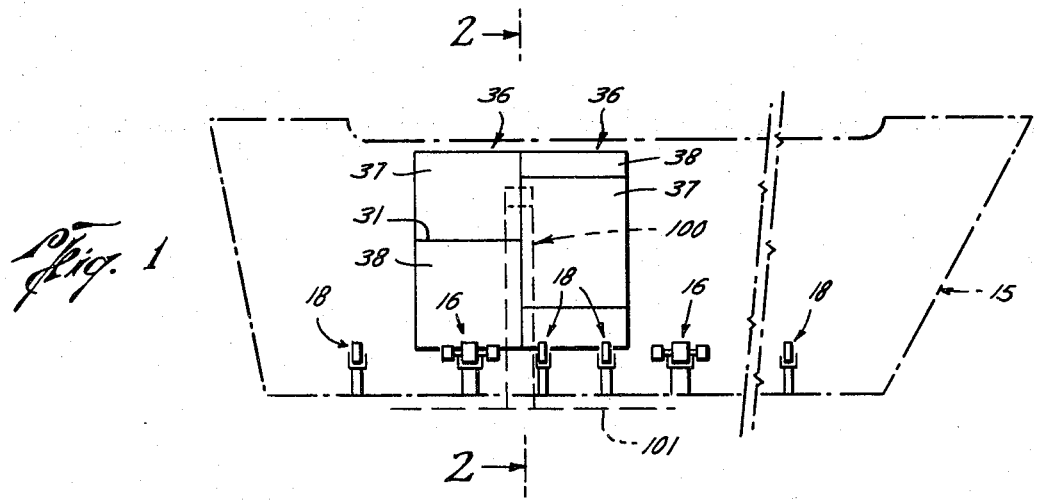
FIG. 1 is a schematic view illustrating a pair of cylindrical sections on drive and idler roll means with a marine hull.

Attention is first directed to FIG. 1 wherein the outline of a marine hull is referred to generally by the numeral 15. The marine hull is diagrammatically illustrated as being completed; however, where the present invention is employed to fabricate the cylindrical containers as the marine hull is fabricated, it can be appreciated that the sections of the marine hull can be added either after or before the various sections of the cylindrical container are formed in situ in horizontal position in the marine hull.

Additionally, a plurality of drive roller means or arrangement is referred to generally at 16, and these also will be positioned as the vessel is fabricated for receiving the sections. Similarly, a plurality of idler roll means referred to generally at 18 are also positioned in the marine hull as it is fabricated to receive the cylindrical sections as they are stepwise added in end to end relation to form the completed cylindrical container.

The idler rollers are placed in position on the saddle supports in the marine hull or on the hull frame and aligned by any suitable means such as a transit so that they will all be in the same horizontal plane to maintain the cylindrical sections supported thereon at a desired height above the support means upon which the completed cylindrical vessel is to rest when completed.

By referring to FIG. 5, which is a diagrammatical sectional view of a marine hull again referred to at 15, it can be appreciated that such marine hull may be of suitable width to receive a plurality of cylindrical containers therein. The cylindrical sections of such containers are referred to generally by the numerals 20 and 21 and the marine hull during fabrication is formed with a suitable curved saddle support means referred to at 25 for receiving each of the completed containers. Either idler or drive roll means is arranged on top of the saddles to engage the cylindrical sections to retain them in elevated relationship as represented at 28 relative to the curved support surface 29 formed on each of the saddle support means 25. Idler roll means 18 are shown on the saddle supports in FIG. 5, and a drive roller 16 is shown in FIG. 6.

Suitable means as referred to generally at 35 as shown in FIG. 6 are provided for mounting the drive roll means 16 on the saddle means to maintain the drive rollers 16 in frictional driving relationship with the cylindrical sections, and as previously noted the idler roll means 18, whether mounted on a saddle support or the hull frame, maintain the cylindrical sections in spaced relation relative to the curved support surface 29 of the saddle support means 25. This will be described in greater detail hereinafter.

Figure 2:
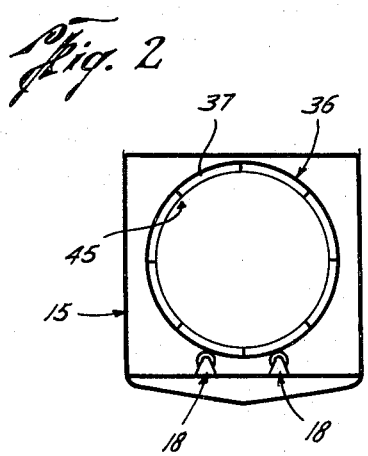
FIG. 2 is a sectional view on the line 2—2 of FIG. 1 diagrammatically illustrating the relationship of one of the cylindrical sections and idler roller means therefor.

It can be appreciated that any combination of drive and support rollers may be employed as desired to accomplish the results of the present invention. In FIG. 2 one of the cylindrical sections which may be referred to generally by the number 36 is shown in end view on idler roller means 18 mounted in the marine hull 15. The cylindrical sections, depending upon their size and wall thickness, may require suitable reinforcing rings as illustrated at 37 arranged at axially spaced intervals internally of the sections. Ordinarily, the cylindrical sections such as the cylindrical sections referred to at 36 in FIG. 1 are formed in a manner well known in the art by a plurality of curved plates 37 and 38 (FIG. 1) which are welded together along their edges 39. Of course, a suitable number of such plates are provided, depending upon the diameter of the cylindrical section desired.

Figure 3:
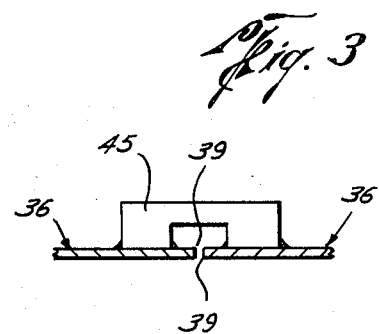
FIG. 3 illustrates an example of an arrangement for temporarily connecting the cylindrical sections in end to end relation prior to welding the sections with a one pass electro-gas welding system at their circumferential edge portion during final fabrication.

As each cylindrical section is formed, it is lifted into position on either a drive or idler roller within the marine hull 15, and is placed in end to end relation as shown in FIG. 3 wherein the sections 36 are again illustrated with their ends 39 adjacent each other. Any suitable arrangement may be employed to temporarily connect such sections together, such as the bracket 45 which is welded across the ends 39 for use with a commercially available one-pass welding machine, well known in the art. If desired, other means well known in the art, such as tack welding at circumferentially spaced points along the adjacent edge of the end to end cylindrical sections, may be employed if desired for use with multipass welding equipment from one side or the other of the cylindrical sections in a manner well known in the art.

Thereafter, the sections are rotated and as they are rotated, a mechanical welder of well known design (such as a one-pass electro-gas welding system) is positioned so that as the sections 36 are rotated, a weld will be formed at the ends 39 of each section to connect them together.

After the sections 36 have been welded together, an additional section 46 may be added and supported on roller means, either an idler roller or drive roller means, and it in turn connected to the section 36 by the brackets 45 so that when the previously welded sections 36 are rotated, the section 46 will rotate therewith. Again the end to end relationship of the section 46 to the previously welded cylindrical sections 36 enables the cylindrical section 46 to be welded thereto, either by an automatic mechanical welded, or by hand, as such sections are simultaneously rotated. If desired, all the cylindrical sections could be temporarily connected and then rotated in situ to weld the adjacent circumferential edge portions. The temporary brackets 45 are removed after the sections are permanently welded.

Figure 4:
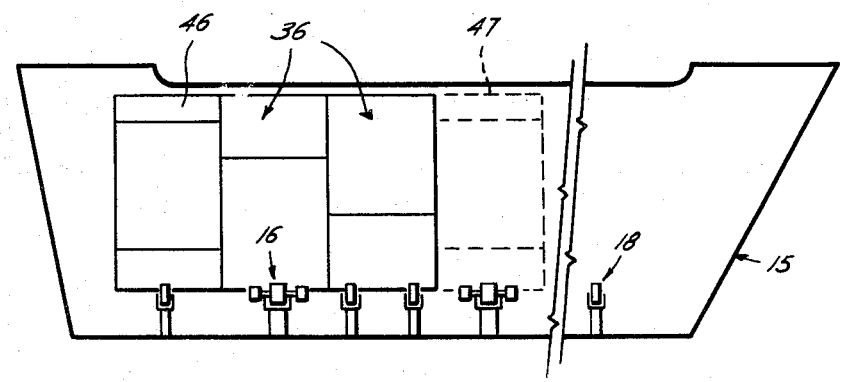
FIG. 4 is a sectional view showing a plurality of cylindrical sections welded together and illustrated in dotted line another section in end to end relation to the previously welded or temporarily connected sections to enable such additional section to be welded thereto.

Represented in dotted line in FIG. 4 is yet another cylindrical section 47 which is positioned in end to end relation to the previously welded sections and then temporarily secured thereto by the bracket means 45 or other suitable means and the previously welded sections are then rotated, which effects rotation of the newly added section 47 so that the newly added section may be welded to the previously connected section as it is rotated by welding.

It can be appreciated that the completed cylindrical containers may be of substantial size, both in diameter and length, as previously noted, and it is necessary during fabrication to maintain the cylindrical sections elevated on the idler rollers in relation to the curved saddle support means 25 in the marine hull or other environment in which the container is being formed in situ.

The present invention provides an arrangement whereby uniform frictional engagement between all of the drive roller and cylindrical sections is maintained. Also, when the vessel is completed, the drive rollers can be elevated to permit the idler rollers to be removed and the drive rollers then lowered to position the completed container on the supports in the marine hull, as will be described in detail.

One suitable arrangement to accomplish the above is as shown in FIG. 6 wherein the drive roller means 16 includes a roller 16a which is shown as drivingly engaging the cylindrical section 21. The drive roller means is carried by a suitable support referred to generally at 50. The support 50 is pivotally mounted at 51 to the curved saddle support means 25 at one side of the bracket or support means 50 and means for moving the bracket means 50 and the roller means 16 carried thereby is illustrated at 52. Where the drive roller is supported on the marine hull frame instead of a saddle means 25 as shown in FIG. 6, the bracket 50 would be pivotally connected to the marine hull frame, and the means 52 in such case is also supported on the marine hull frame. The means 52 comprises a hydraulic cylinder which engages the bracket 50 to maintain proper drive roll traction load so that the drive roller 16a drivingly engages the section immediately above the saddle support means 25. Each drive roller arrangement 16 includes a hydraulic cylinder 52, and all hydraulic cylinders 52 are connected to a common liquid supply manifold so that all drive rollers exert the same frictional engagement throughout the longitudinal extent of the vessel under construction. This will be described in greater detail.

It can be appreciated that there may be a plurality of saddle support means at spaced longitudinal intervals throughout the marine hull, and where the drive rollers are carried by the saddles 25 it is necessary to provide the arrangement as shown in FIG. 6 at intervals determined by hull design and tank weight to maintain the necessary drive roll traction load. Similarly, when the drive rollers 16 are supported on the marine hull frame, the hydraulic cylinder support as illustrated in FIG. 6 is employed, as previously noted.

To inhibit creeping of the sections, it is necessary to maintain the axis of the drive and idler roll means parallel to the center axis of the cylindrical sections which they engage. In FIGS. 7 and 8 one suitable arrangement for accomplishing such function is shown, wherein the drive roller means 16 is again referred to. The drive roller 16a includes shafts which extend through the spaced supports 16b, one of which roller shafts is engaged by the clamping collar 16c to a suitable power source such as an electric motor 16d or the like. The other shaft of the roller 16a is clamped by collar 16c to be supported in bracket 16d'. Bracket 16d' as well as brackets 16b form a support 16e which is mounted on the base 16f, and the support 16e is pivotally connected to the support base 16f by the pivot pin 16g as shown more clearly in FIG. 8 and as also illustrated in dotted line in FIG. 7. Of course, suitable bearing means are provided for the shafts in 16b and 16d' to support the weight of the cylindrical sections and container as it is being fabricated. The motor 16d is carried on support 16e.

Spaced threaded brackets 16i are mounted on the support 16e at the opposite end of the supports 16e and 16f which are pivotally connected by pin 16g as more clearly seen in FIGS. 7 and 8, and a threaded bracket 16h is mounted on the base plate 16f. A threaded shaft 16j extends through the brackets 16h and 16i so that upon rotation thereof the drive roller motor 16d as well as the drive roller 16a and its support 16e is pivotally moved on the plate 16g. This enables the axis of the drive roller 16a to be aligned with the center line of the section which the drive roller 16a engages.

Figure 9:
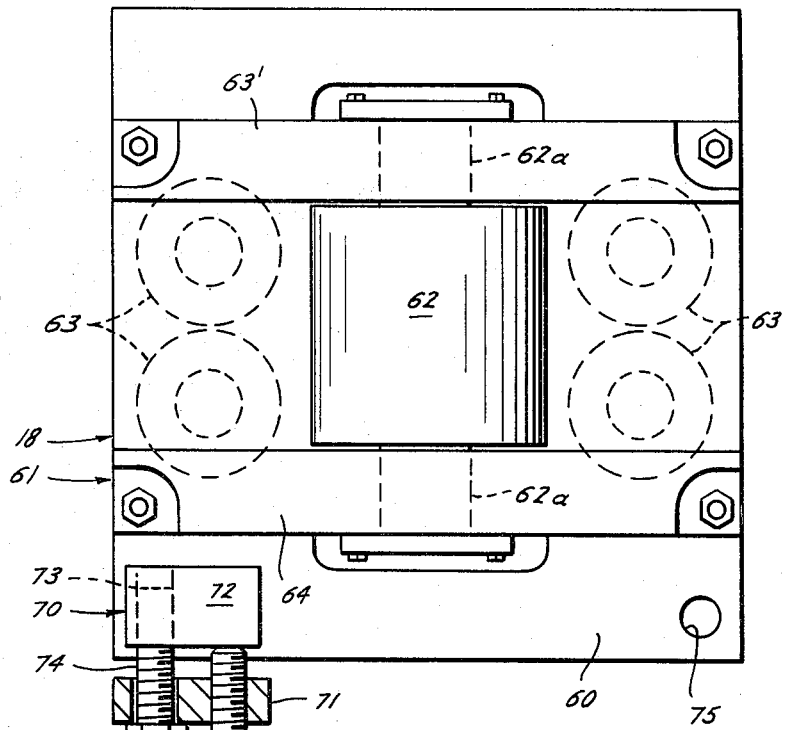
FIG. 9 is a plan view of the idler roller arrangement and shows one means of adjusting the idler roll arrangement.
Figure 10:
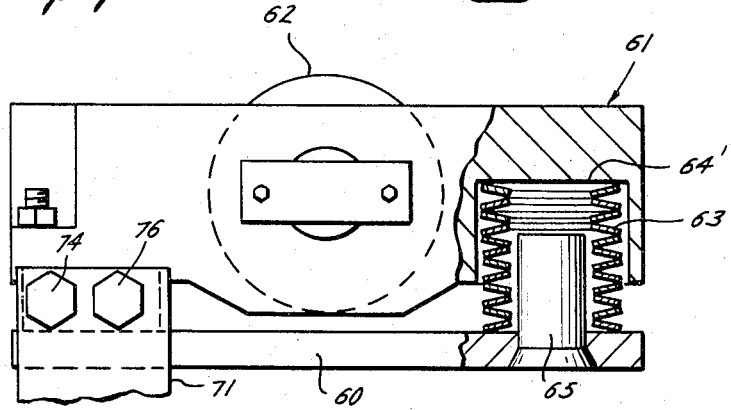
FIG. 10 is an end view of the idler roll arrangement of FIG. 9 partly in section to illustrate the spring loaded arrangement thereof.

A preferred form of the idler roll means 18 is shown in greater detail in FIGS. 9 and 10 and includes a support base 60 on which the idler roll support means referred to generally at 61 is carried. The idler roller is referred to at 62 and is provided with suitable shafts that extend through the spaced brackets 63' and 64 to accommodate rotation thereof.

It can be appreciated that the idler rollers and drive rollers must accommodate substantial loads, and the idler rollers accomplish such function by providing a plurality of vertically stacked Bellville springs or washers 63 which are illustrated in dotted line in FIG. 9, and one of which stacked arrangements is shown in FIG. 10 in sectional view. As shown in FIG. 9, there are four sets of Bellville spring arrangements 63, each stacked arrangement being positioned in a cylindrical bore 64' within the support 61, as shown in FIG. 10. Guide pins 65 extend upwardly from the base plate 60 to aid in guiding the Bellville springs during compression loading of the idler rollers 62. It can be appreciated that suitable bearing means are provided between the shafts 62a of the drive roller 62, which shafts are shown in dotted line, and the brackets 63' and 64 to carry the loads to which the idler rollers 62 are subjected.

Means referred to generally at 70 are provided for adjusting the idler roller 62 so that its axis through its shaft 62a may be maintained parallel to the center axis of the cylindrical section which it engages. Such means includes a bracket 71 mounted on the marine hull or on a support member connected to the marine hull and a bracket 72 which is provided with a threaded opening 73 for receiving the threaded shaft 74 supported in the opening in bracket 71. The support 61 is pivotally connected to the base member 60 by the pivot pin 75 so that when the threaded bolt 74 is rotated in the threaded bore 73, the idler roller support 61 is moved relative to the support 60. The threaded bolt 76 threaded through the bracket 71 abuts the bracket 72 and locks or maintains the support 61 and idler roller 62 in any predetermined, adjusted position.

Similarly, the threaded shaft 16j, along with the brackets 16h and 16i of the drive roller arrangement illustrated in FIG. 7, not only adjusts the support 16e of the idler roller means 16 relative to the base plate 16f, but also maintains such rollers in such adjusted position. It may be necessary from time to time during fabrication of the container to readjust either the idler roll means or the drive roller means.

Figure 11:
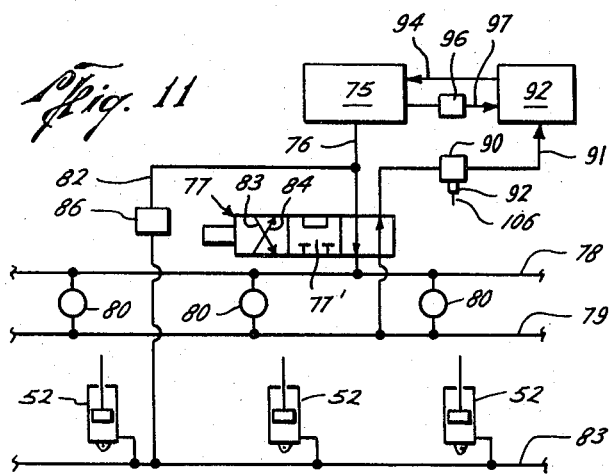
FIG. 11 is a schematic diagram of a hydraulic control system for the drive rollers.

FIG. 11 illustrates diagrammatically the hydraulic control system for drive roller arrangement 16. A liquid supply is represented at 75, and is connected by conduit 76 to four way, three position valve 77. Valve 77 controls flow to conduits 78, 79, which communicate to a bidirectional (reversible) hydraulic motors represented at 80 that drive the drive rollers 16. Since all motors are connected to the same hydraulic lines (78, 79), the drive rollers 16a are uniformly rotated at the same rate, and by positioning valve 77 so that the flow from conduit 76 is through passages 83 and 84 of valve 77, the flow through conduit 78, 79 can be reversed to reverse the direction of hydraulic motors 80 and drive rollers 16 operated thereby.

The hydraulic cylinders 52 are connected to conduit 76 by conduit 82 which supplies liquid to manifold 83 which connects with each hydraulic cylinder 52 that movably supports the drive roller means 16 as previously described.

A manually operated pressure control valve 86 in conduit 82 is adjusted to insure proper traction of drive roll 16a with the surface of the cylindrical sections being rotated, and as previously noted, the same force is applied to all drive rollers since they all have a common supply manifold 83.

A flow control valve 90 is connected in conduit 91 between valve 77 and tank 92. The tank 92 is connected to supply 75 by conduit 94, and a pressure relief valve 96 is connected in conduit 97 to relieve excessive pressure from source 75 to tank 92.

The flow control valve 90 functions as a motor speed control for hydraulic motors 80 and as a start-stop control for the motors. The valve 90 is normally closed and it is provided with a solenoid 92 which actuates valve 90 to periodically, momentarily open it to effect flow of hydraulic fluid to motors 80 to cause them to rotate and thus rotate the cylindrical sections. It can be appreciated that rotation of the cylindrical sections must be synchronized with the welding operation so that the one-pass electrogas welding system illustrated at 100 in dotted line in FIG. 1 fills the void between the circumferential ends of adjacent cylindrical sections, they are rotated stepwise so that the welding operation will proceed continuously and uniformly.

The automatic welder 100 may be mounted on tracks 101 so that it can be positioned adjacent the cylindrical section ends for welding thereof.

Figure 12:
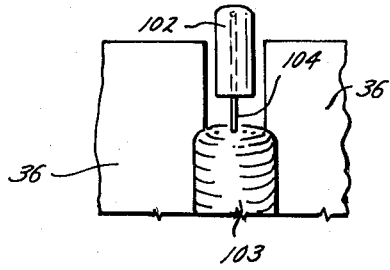
FIG. 12 is a schematic representation of a weld being effected between cylindrical section ends.

The operation of the automatic welder is well known in the art. Also, the manner of automatically adjusting, the position of the welding tip diagrammatically represented at 102 in FIG. 12 of the automatic welder 100 relative to the weld pool 103 as the welding rod 104 shortens is well known in the art. It can be appreciated that the weld pool 103 is formed between cylindrical section ends 36 to connect them together.

As the voltage drops in the automatic welder 100 due to the relative position of the tip 102 to pool 103, such voltage drop is employed to automatically reposition the tip 102 and the same voltage signal is transmitted by suitable electrical conduit 106 to actuate solenoid 92 and open valve 90 momentarily to cause hydraulic motors 80 to rotate cylindrical sections 36 so that the welding tip 102 and welding rod 104 may start a new pool 103 after a weld portion between the cylindrical ends has been completed.

It can be appreciated that after tip 102 has been automatically repositioned, the signal ceases, and this deactivates solenoid 92 and valve 90 closes.

After the void between the ends of sections 36 is filled, the brackets 45 may be removed. After the vessel has been completed, pressure control valve 86 is opened to supply hydraulic fluid to cylinders 52 so that the hydraulic cylinders 52 elevate the completed vessel off the idler rollers 18 so that the idler rollers may be removed. The liquid pressure is then relieved from manifold 83 to lower the vessel onto its final support in the marine hull.

From the foregoing, it can be appreciated that the present invention provides a method and arrangement for forming a cylindrical container or a plurality of cylindrical containers in side by side relation in situ in horizontal position and in final end use position.

Suitable end closures may be provided for the containers of any desired configuration and may be secured in place by welding, as previously described.

The foregoing disclosure and description of the invention are illustrative and explanatory thereof, and various changes in the size, shape, and materials as well as in the details of the illustrated construction may be made without departing from the spirit of the invention.

What is claimed is:

1. A method of assembling a cylindrical container in situ in horizontal position comprising the steps of:
   a. positioning a first ring of predetermined size on support roller means so that the longitudinal axis of the ring is substantially horizontal;
   b. positioning a predetermined number of additional rings on support roller means in end to end relation to the first ring;
   c. simultaneously rotating the rings while welding them together at their circumferential joint formed by adjacent rings;
   d. closing the ends of the cylindrical container;
   e. removing the roller support means from the container; and
   f. providing a plurality of spaced saddle means to support the container when the roller means are removed.

* * * * *